United States Patent [19]
Chan

[11] 3,915,941
[45] Oct. 28, 1975

[54] ACRYLONITRILE POLYMERIZATION USING SODIUM SULFOXYLATE FORMALDEHYDE

[75] Inventor: David Yee Hing Chan, Pensacola, Fla.

[73] Assignee: American Cyanamid Company, Stamford, Conn.

[22] Filed: Feb. 7, 1974

[21] Appl. No.: 440,419

Related U.S. Application Data

[62] Division of Ser. No. 297,551, Oct. 13, 1972, Pat. No. 3,821,177.

[52] U.S. Cl. .... 260/85.5 R; 260/63 N; 260/79.3 M; 260/85.5 S; 260/85.5 ES; 260/85.5 D; 260/85.5 HC; 260/85.5 L; 260/85.5 XA; 260/88.7 R; 260/88.7 B; 260/88.7 D; 260/88.7 E
[51] Int. Cl.$^2$............ C08F 220/42, C08F 220/70, C08F 120/42, C08F 120/70
[58] Field of Search...... 260/85.5 R, 85.5 S, 85.5 D, 260/85.5 L, 88.7 R, 88.7 B, 88.7 D, 88.7 E, 85.5 ES, 85.5 HC:85.5 XA

[56] References Cited
UNITED STATES PATENTS

| 2,546,238 | 3/1951 | Richards | 260/88.7 R |
| 2,560,694 | 7/1951 | Howard | 260/88.7 D |
| 3,058,937 | 10/1962 | Furness | 260/85.5 D |

Primary Examiner—Joseph L. Schofer
Assistant Examiner—Herbert J. Lilling
Attorney, Agent, or Firm—Philip Mintz

[57] ABSTRACT

Polymerization of acrylonitrile in aqueous system using water-soluble redox catalyst system comprising oxidizing catalyst and reducing bisulfite activator is improved by (a) conducting the polymerization in the presence of 0.1 to 0.5 parts of sodium sulfoxylate formaldehyde per 100 parts of monomer to inhibit cyanide by-product formation and/or (b) the use of sodium sulfoxylate formaldehyde to shortstop the polymerization reaction while minimizing the formation of undesirable water-soluble acrylonitrile-bisulfite addition product.

6 Claims, No Drawings

ACRYLONITRILE POLYMERIZATION USING SODIUM SULFOXYLATE FORMALDEHYDE

This is a division of application Ser. No. 297,551, filed Oct. 13, 1972, now U.S. Pat. No. 3,821,177.

This invention relates to polymerization of acrylonitrile and recovery of unreacted monomer from such polymerization while minimizing the formation of undesirable by-products.

It is well-known to polymerize acrylonitrile, alone or with one or more ethylenically unsaturated monomers copolymerizable therewith, in aqueous systems using water-soluble redox catalyst systems comprising an oxidizing catalyst and a reducing bisulfite activator. In such process, it is common practice to stop the polymerization reaction prior to complete polymerization of all monomers and, thereafter, to recover the unreacted monomers from the slurry which contains water, polymer, unreacted monomer, catalyst residues, etc. for reuse. Usually such monomer recovery involves evaporation of unreacted monomers either from the polymerization slurry directly or from the filtrate after removal of the insoluble polymer by filtering the slurry.

In accordance with the present invention, this polymerization and monomer recovery process is improved by (a) the use of 0.1 to 0.5 parts of sodium sulfoxylate formaldehyde per 100 parts of monomer fed to the polymerization reactor along with monomer, redox catalyst system comprising oxidizer catalyst and bisulfite activator, water, etc. to inhibit cyanide by-product formation or (b) the addition of about 1%, on weight of unreacted monomer, of sodium sulfoxylate formaldehyde to the polymerization slurry to short-stop the polymerization reaction while minimizing the formation of undesirable water-soluble acrylonitrile-bisulfite addition product, or both (a) and (b) in combination.

Acrylonitrile polymers find wide use in the production of synthetic fibers. Such polymers may be made by polymerizing acrylonitrile alone, or in combination with one or more ethylenically undaturated monomers copolymerizable therewith, such as those mentioned, for instance, in U.S. Pat. Nos. 3,104,938 and 3,040,008 and the various other patents mentioned therein. Such monomers include, but are not limited to, vinyl acetate, methyl acrylate, methyl methacrylate, vinylpyridines, styrene, styrene sulfonic acid, vinyl chloride, vinylidene chloride, acrylic acid, acrylamide, methyl vinyl ketone, etc. Such acrylonitrile polymers normally contain a major proportion (more than 50%) acrylonitrile, and preferably, more than 70% acrylonitrile with the remainder being such other ethylenically unsaturated comonomers. The present invention is useful in connection with producing such acrylonitrile polymers.

Acrylonitrile polymers can be prepared by the use of free-radical polymerization initiators of several types. Redox catalyst systems, comprising an oxidizing catalyst and a reducing activator, are currently in wide commercial use. Especially preferred commercially are those redox catalyst systems which utilize a reducing bisulfite activator. Illustrative of these bisulfite activators are materials which produce bisulfite ions when dissolved in an aqueous acidic oxidizing medium, such as alkali metal sulfites, bisulfites, metabisulfites, hydrosulfites, and thiosulfates, and sulfur dioxide. Illustrative of the conventional oxidizing catalysts used with such reducing bisulfite activators are alkali metal chlorates and persulfates. Such redox catalyst systems are water soluble and are used to polymerize acrylonitrile in an aqueous polymerization medium which is maintained at a low pH, usually by the addition of acid, usually a strong inorganic acid such as nitric or sulfuric acid. It is in connection with use of these well-known redox catalyst systems for polymerizing acrylonitrile that the present invention is concerned.

When the polymerization reaction has proceeded to the point where the desired proportion of monomer has been converted to polymer, usually about 60 to 90 percent conversion, the reaction is stopped by the addition of a shortstopping agent. Thereafter, the slurry, which contains water, polymer unreacted monomer, catalyst residues, is processed to recover unreacted monomer for reuse and polymer for further treatments leading to final products. Usually such processing involves evaporation of unreacted monomers either from the polymer slurry directly or from the filtrate after filtering the slurry to remove insoluble polymer. The reasons why stopping the polymerization reaction while a substantial proportion of the monomers are unreacted, desirable characteristics sought in shortstopping agents, and previously proposed shortstopping agents may be found in the prior art, representative of which are Richards U.S. Pat. No. 2,546,238; Howland et al. U.S. Pat. No. 2,556,651; Hieserman et al. U.S. Pat. No. 3,084,143; Himes et al. U.S. Pat. No. 3,091,602; Thompson et al. U.S. Pat. No. 3,153,024; Nakajima et al. U.S. Pat. No. 3,192,189; Sampson et al. U.S. Pat. No. 3,308,109; and Cheape et al. U.S. Pat. No. 3,454,542.

As is generally true with complex organic chemical processes, the above-described prior art processes for polymerizing acrylonitrile and recovering unreacted monomer produce unwanted by-products due to unintended reactions among the many reactants concurrently present in the same system. The production of such by-products is undesirable for many reasons, among which are wastage of raw materials and creation of deleterious substances which must be recovered from process streams at considerable expense or discarded as contaminants in waste water with concommitant polution of natural waterways. The present invention is particularly concerned with minimizing the production of two of the by-products normally produced by this process.

During the polymerization of acrylonitrile in an aqueous system by using a water-soluble redox catalyst system comprising an oxidizing catalyst and a reducing bisulfite activator, hydrogen cyanide is formed as one of the by-products. It is soluble in water and in acrylonitrile monomer and, during the post-polymerization processing of the polymerization slurry to recover unreacted monomers for reuse, it distills over with the acrylonitrile and is recycled into the polymerization reactor. The concentration of hydrogen cyanide in the system resulting from this recycling gradually increases and eventually this by-product finds its way into various effluent streams where, if particular care is not taken to remove it, it finds its way into natural waterways. In accordance with the present invention, the amount of hydrogen cyanide formed in this process is sharply reduced by the use of 0.1 to 0.5 parts of sodium sulfoxylate formaldehyde per 100 parts of monomer fed to the polymerization reactor. While the method of adding the sodium sulfoxylate formaldehyde to the polymerization reactor is not critical, it is preferably introduced as an aqueous solution to ensure good mixing. Use of less than 0.1 part sodium sulfoxylate formaldehyde per 100 parts of monomer does not sufficiently inhibit formation of hydrogen cyanide while use of more than 0.5 part seriously reduces the proportion of the monomer converted to polymer to an unacceptable level.

When the polymerization reaction has reached the desired conversion level, the reaction is stopped by addition of a shortstopping agent. Most often, the shortstopping agent serves, inter alia, to raise the pH of the polymerization slurry to above about 5. It has been observed that at these elevated pH values, an acrylonitrile-bisulfite addition product is formed from unreacted acrylonitrile monomer and unconsumed bisulfite activator of the redox catalyst system. Although at low pH values, formation of the acrylonitrile-bisulfite addition product can be minimized, it is difficult to find shortstopping agents which are effective at such low pH values. Provided the polymerization slurry is distilled to remove unreacted monomers immediately after shortstopping, Cheape et al. U.S. Pat. No. 3,454,542 suggests use of oxalic acid as the shortstopping agent. However, there may be occasions where it is desirable to use another, different shortstopping agent. Useable agents capable of shortstopping this reaction without increasing the pH to above 5 are difficult to find. In accordance with the present invention, the polymerization reaction is shortstopped by adding sufficient sodium sulfoxylate formaldehyde to the polymerization slurry to inhibit further polymerization, preferably about 1% on weight of unreacted monomer although more may be used. This shortstopping agent is effective at low pH values (it does not materially change the pH of the polymerization slurry) which inhibits the formation of acrylonitrile-bisulfite addition product for an extended period. While the method of adding the sodium sulfoxylate formaldehyde to the polymerization slurry is not critical, it is preferably added as an aqueous solution to ensure good mixing.

Although it is preferable to utilize both additions of sodium sulfoxylate formaldehyde in combination, either can be used alone to reduce unwanted by-product formation as described above.

The following examples will serve to illustrate preferred embodiments of this invention. All proportions are by weight unless otherwise indicated.

EXAMPLE 1

A water-jacketed reactor having a volume of 6.78 liters is provided with a propeller-type stirrer driven by a motor which rotates at about 900 RPM. The reactor is provided with a four-feed delivery system and, at its top, an overflow tube. To start-up for continuous polymerization using this reactor, it was filled with water containing 25 grams of sodium metabisulfite adjusted to a pH of about 2.7 with nitric acid and warmed to 55°C. During continuous polymerization, four feed liquids are metered into the reactor continuously, the reaction temperature is maintained at 55°C., and polymerization slurry continuously overflows through the overflow tube.

To serve as a basis of comparison, a control run without use of sodium sulfoxylate formaldehyde was performed using the following four feed compositions and feed rates:

Feed I — 90.6% acrylonitrile and 9.4% methyl methacrylate monomers containing 5 ppm hydrogen cyanide at 2,411 cc./hr.

Feed II — Aqueous solution of 10% sodium metabisulfite reducing activator at 591 cc./hr.

Feed III — Aqueous solution of 0.9% sodium chlorate oxidizing catalyst at 745 cc./hr.

Feed IV — Deionized water at 3,033 cc./hr.

During the course of the polymerization reaction, the pH remains at about 2.5–2.6. After equilibrium conditions had been attained (after several hours of operation), samples were taken of the reactor overflow slurry for analysis. The slurry contained about 25.7% polymer solids, the conversion of monomer to polymer was about 85.6%, the polymer composition was about 89.3% acrylonitrile and 10.7% methyl methacrylate, the polymer had an intrinsic viscosity of 1.48 and a weight average molecular weight of about 114,000, and the polymer was found to contain about 0.133% sulfur. At equilibrium, the polymerization slurry was found to contain about 12–13 ppm hydrogen cyanide.

EXAMPLE 2

To illustrate the present invention, Example 1 was repeated except that Feed III also contained 0.75% sodium sulfoxylate formaldehyde and there were minor changes in feed rates (viz., Feed I — 2,411 cc./hr.; Feed II — 709 cc./hr.; Feed III — 894 cc./hr.; and Feed IV — 2,766 cc./hr.). Thus, in this example, approximately 0.35 part of sodium sulfoxylate formaldehyde was fed to the reactor for each 100 parts of monomer.

During the course of the polymerization, the pH remains at about 2.6–2.7. After equilibrium conditions had been attained, analysis of slurry samples showed that the slurry contained about 25.3% polymer solids, the conversion of monomer to polymer was about 84.3%, the polymer composition was about 89.3% acrylonitrile and 10.7% methyl methacrylate, the polymer had an intrinsic viscosity of 1.46 and a weight average molecular weight of about 110,000, and the polymer was found to contain 0.131% sulfur. At equilibrium, the polymerization slurry was found to contain about 2.8–4.2 ppm hydrogen cyanide. Thus, the presence of the sodium sulfoxylate formaldehyde within the critical concentration range in the polymerization reactor reduced the amount of hydrogen cyanide produced to less than one-sixth of the amount produced in the control run of Example 1.

EXAMPLE 3

Example 2 was repeated except that higher amounts of sodium sulfoxylate formaldehyde were used. In one run, where 0.6 part of sodium sulfoxylate formaldehyde per 100 parts of monomer was added, the conversion of monomer to polymer decreased to about 60%. In another run, where 0.8 part of sodium sulfoxylate formaldehyde per 100 parts of monomer was added, there was little or no conversion of monomer to polymer.

EXAMPLE 4

After equilibrium conditions had been attained, a sample of the polymerization reactor overflow slurry of Example 1 (which contained water, acrylonitrile polymer, unreacted monomers, catalyst residues, etc.) was treated immediately after leaving the polymerization reactor with sufficient 5% aqueous sodium hydroxide solution to raise the pH to 6.0–6.5. This is representative of a prior art shortstopping technique. The sample was then allowed to stand for 30 minutes after which the solid polymer was filtered off, the filtrate was evaporated to dryness, and the residue analyzed by infrared technology for nitrile. From this analysis, the amount of acrylonitrile lost as water-soluble acrylonitrile-bisulfite addition product was calculated as about 8.0% on weight of polymer produced.

EXAMPLE 5

Example 4 was repeated except that only sufficient 5% aqueous sodium hydroxide solution to raise the pH to 4.5–5.0 was added. This slightly reduced the acrylonitrile loss as water-soluble acrylonitrile-bisulfite addition product to about 6.0% on weight of polymer produced.

EXAMPLE 6

Example 4 was repeated except that instead of using sodium hydroxide, sufficient 5% aqueous sodium sulfoxylate formaldehyde solution was added to amount to an addition of 1% sodium sulfoxylate formaldehyde on weight of unreacted monomers in the slurry. The pH was unaffected and remained at about 2.5. After allowing the sample to stand for 30 minutes, filtering, evaporating to dryness, and testing the residue as in Example 4, the amount of acrylonitrile lost as water-soluble acrylonitrile-bisulfite addition product was calculated as about 0.6–0.8% on weight of polymer produced. Thus, the use of sodium sulfoxylate formaldehyde as the shortstopping agent reduced the of acrylonitrile monomer as acrylonitrile-bisulfite addition product to less than one-tenth of the amount lost in the representative prior art run of Example 4.

Similar results are obtainable when the slurry of Example 2 is shortstopped with sodium sulfoxylate formaldehyde instead of the slurry of Example 1.

I claim:

1. In process for polymerizing a major proportion of acrylonitrile, alone or with one or more ethylenically unsaturated monomers copolymerizable therewith, in aqueous system using a water-soluble redox catalyst system comprising an oxidizing catalyst and a reducing bisulfite activator, the improvement comprising introducing into said aqueous system 0.1 to 0.5 parts of sodium sulfoxylate formaldehyde per 100 parts of monomer and conducting the polymerization process in the presence thereof.

2. A process as defined in claim 1 wherein said oxidizing catalyst is an alkali metal chlorate.

3. In a continuous process for polymerizing a major proportion of acrylonitrile, alone or with one or more ethylenically unsaturated monomers copolymerizable therewith, wherein water, monomer, and redox catalyst system comprising an oxidizing catalyst and a reducing bisulfite activator are continuously introduced into a polymerization reaction zone and wherein polymerization slurry is continuously withdrawn therefrom, the improvement comprising also continuously introducing into said polymerization reaction zone 0.1 to 0.5 parts of sodium sulfoxylate formaldehyde per 100 parts monomer introduced.

4. A process as defined in claim 3 wherein said sodium sulfoxylate formaldehyde is introduced as an aqueous solution.

5. A process as defined in claim 3 wherein sufficent sodium sulfoxylate formaldehyde is added to said polymerization slurry after withdrawal from said polymerization reaction zone to stop further polymerization.

6. A process as defined in claim 5 wherein about 1% on weight on unreacted monomer of said sodium sulfoxylate formaldehyde is added to said slurry.

* * * * *